United States Patent [19]
Sakamoto

[11] Patent Number: 5,874,795
[45] Date of Patent: Feb. 23, 1999

[54] MULTI-PHASE PERMANENT-MAGNET TYPE ELECTRIC ROTATING MACHINE

[75] Inventor: Masafumi Sakamoto, Kiryu, Japan

[73] Assignee: Japan Servo Co., Ltd, Tokyo-to, Japan

[21] Appl. No.: 773,126

[22] Filed: Dec. 26, 1996

[30] Foreign Application Priority Data

Dec. 28, 1995 [JP] Japan .................................... 7-352346

[51] Int. Cl.⁶ .................................................. H02K 19/10
[52] U.S. Cl. ........................ 310/156; 310/49 R; 310/166; 310/179; 310/181; 310/184; 310/185; 310/198; 310/254
[58] Field of Search ................................ 310/49 R, 254, 310/156, 179, 181, 166, 184, 185, 198

[56] References Cited

U.S. PATENT DOCUMENTS

| | | | |
|---|---|---|---|
| 3,465,225 | 9/1969 | O'Regan et al. | 318/138 |
| 3,866,104 | 2/1975 | Heine | 318/696 |
| 3,984,711 | 10/1976 | Kordik | 310/49 R |
| 4,206,374 | 6/1980 | Goddijn | 310/49 R |
| 4,347,457 | 8/1982 | Sakamoto | 310/256 |
| 4,384,226 | 5/1983 | Sato et al. | 310/89 |
| 4,475,051 | 10/1984 | Chai et al. | 310/49 |
| 4,499,391 | 2/1985 | Sakamoto | 310/89 |
| 4,503,368 | 3/1985 | Sakamoto | 310/49 R |
| 4,672,253 | 6/1987 | Tajima et al. | 310/269 |
| 4,675,564 | 6/1987 | Isozaki | 310/49 R |
| 4,764,697 | 8/1988 | Christiaens | 310/49 R |
| 4,792,709 | 12/1988 | Smith et al. | 310/49 R |
| 4,794,286 | 12/1988 | Taenzer | 310/12 |
| 4,983,867 | 1/1991 | Sakamoto | 310/49 R |
| 5,032,747 | 7/1991 | Sakamoto | 310/49 R |
| 5,128,570 | 7/1992 | Isozaki | 310/49 R |
| 5,243,246 | 9/1993 | Sakamoto | 310/179 |
| 5,289,064 | 2/1994 | Sakamoto | 310/49 R |
| 5,386,161 | 1/1995 | Sakamoto | 310/49 R |
| 5,410,200 | 4/1995 | Sakamoto et al. | 310/49 R |
| 5,459,385 | 10/1995 | Lipo et al. | 318/701 |
| 5,545,938 | 8/1996 | Mecrow | 310/156 |

*Primary Examiner*—Clayton LaBalle
*Assistant Examiner*—Elvin G. Enad
*Attorney, Agent, or Firm*—Oblon, Spivak, McClelland, Maier & Neustadt, P.C.

[57] ABSTRACT

A multi-phase permanent-magnet type electric rotating machine comprising: a permanent magnet type rotor, the permanent magnet type rotor including pairs of magnetic bodies magnetized by an axially magnetized cylindrical permanent magnet and disposed so as to face each other in a manner so that different poles of the magnetic bodies are disposed alternately or including a cylindrical permanent magnet having a multi-polar-magnetized outer circumferential surface; and a stator disposed so as to face the rotor through an air gap therebetween, the stator having 6N or 10N (N being an integer not smaller than 1) main poles formed in a distributed fashion, the stator having coils wound on 3N or 5N in total of the 6N or 10N main poles selected every other one, wherein the coils wound on the 3N or 5N main poles are connected so as to form a star connection and at least one of the three or five terminals of the star connection of the coils is connected to a predetermined polarity of a power supply while all or part of the other terminals of the star connection are connected to the same opposite polarity of the power supply, whereby the polarity of one of the three or five terminals of the star connection is reversed sequentially by driving so that the rotor is made to rotate step by step.

5 Claims, 12 Drawing Sheets

FIG. 2A  FIG. 2B
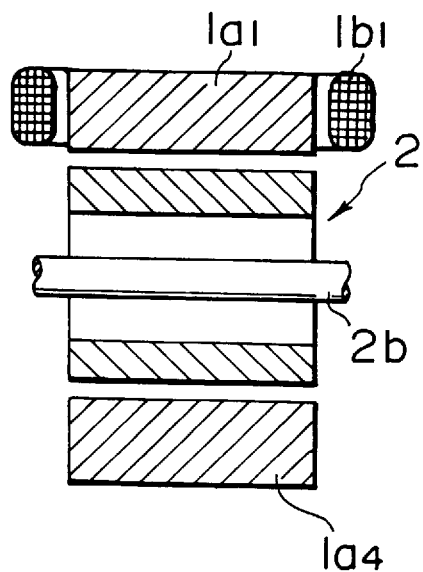
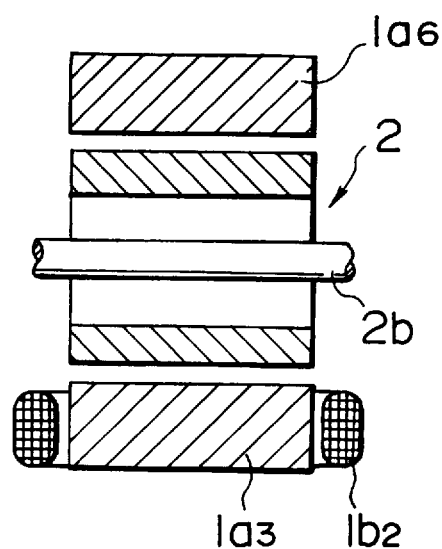
FIG. 3
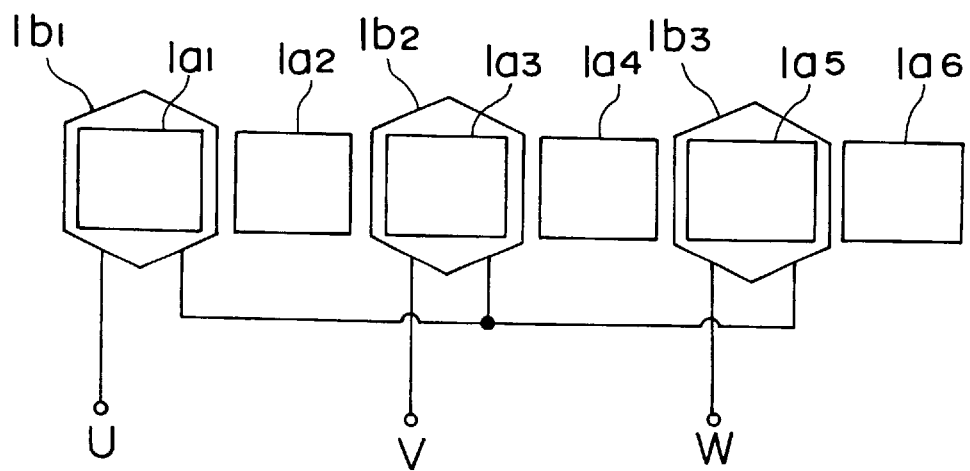

|   | U | V | W |
|---|---|---|---|
| 1 | + | − | − |
| 2 | + | + | − |
| 3 | − | + | − |
| 4 | − | + | + |
| 5 | − | − | + |
| 6 | + | − | + |

|   | U | V | W |
|---|---|---|---|
| 1 | + | − |   |
| 2 |   | − | + |
| 3 | − |   | + |
| 4 | − | + |   |
| 5 |   | + | − |
| 6 | + |   | − |

MULTI-PHASE PERMANENT-MAGNET TYPE ELECTRIC ROTATING MACHINE

BACKGROUND OF THE INVENTION

1. Field of the Invention

The present invention relates to a structure of a electric rotating machine and a driving method thereof, and particularly relates to an inexpensive electric rotating machine which is the most suitable for a scanner motor of a copying machine or the like, and which is required to be low in vibration as well as in rotational irregularity.

2. Description of the Prior Art

An inner-rotor 3-phase 6-slot permanent-magnet type stepping motor (hereinafter simply referred to as "3-phase electric rotating machine"), which is one of conventional multi-phase permanent-magnet type electric rotating machines, has such a structure, for example, as shown in FIG. 15.

FIG. 15 is a conceptual sectional view schematically illustrating the structure of an inner-rotor 3-phase electric rotating machine, in which the reference numerals 10 and 20 represent a stator and a rotor, respectively. A rotation shaft, a housing and so on are omitted in the drawing.

The rotor 20 is rotatably supported by a not-shown rotation shaft and bearings. In FIG. 15, the reference character N represents an N (north) pole of a permanent magnet which is magnetized so that the N-pole faces the stator, and S represents an S (south) pole of a permanent magnet which is magnetized so that the S-pole faces the stator. Thus, two pairs of magnetic poles are formed.

The stator 10 has main poles 10a1, 10a2, 10a3, 10a4, 10a5 and 10a6 formed at a predetermined distance from the surface of the rotor 20, and exciting coils 10b1, 10b2, 10b3, 10b4, 10b5 and 10b6 are wound in the same direction on the main poles 10a1, 10a2, 10a3, 10a4, 10a5 and 10a6, respectively.

FIG. 16 shows an example of the connection of the above-mentioned coils 10b1, 10b2, 10b3, 10b4, 10b5 and 10b6. The reference numerals 10b1, 10b2, 10b3, 10b4, 10b5 and 10b6 shown in FIG. 16 are corresponding to the reference numerals of the coils shown in FIG. 15 respectively.

Specifically, for example, let the winding start of the lead wire of the first coil 10b1 be a U-terminal of this electric rotating machine, then the winding end of the first coil 10b1 is connected to the winding start of the fourth coil 10b4. Let the winding start of the lead wire of the second coil 10b2 be a V-terminal of the electric rotating machine, then the winding end of the second coil 10b2 is connected to the winding start of the fifth coil 10b5, and let the winding start of the lead wire of the third coil 10b3 be a W-terminal of the electric rotating machine, the winding end of the third coil 10b3 is connected to the winding start of the sixth coil 10b6.

The winding ends of the other coils 10b4, 10b5 and 10b6 are connected to each other.

That is, the exciting coils of this electric rotating machine form a star connection.

FIG. 17 shows an exciting method of the electric rotating machine having such a structure as shown in FIGS. 15 and 16.

The numerical values 1 to 6 in the leftmost column in FIG. 17 show the order of exciting steps from top to bottom, returning to the step 1 after reaching the step 6.

The characters U, V an d W in the uppermost row show the terminals shown in FIG. 16.

The symbol (+) shows a predetermined direction of an electric current, that is, the direction of the current flowing into the above-mentioned terminals, and (−) shows the opposite direction, that is, the direction of the current flowing out of the terminals.

Specifically, the step 1 shows that a current of a predetermined value is made to flow from the terminal U to the terminal V. Therefore, in the step 1, for example, the first main pole 10a1 and the fourth main pole 10a4 become N-poles, and the second main pole 10a2 and the fifth main pole 10a5 become S-poles.

Similarly to this, the step 2 shows that the current of the same value is switched so as to flow from the terminal W to the terminal V so that the third main pole 10a3 and the sixth main pole 10a6 become N-poles and the second main pole 10a2 and the fifth main pole 10a5 become S-poles. By the change of the terminals to which the exciting current is supplied as shown in FIG. 17, the electric rotating machine rotates at a rotational speed in accordance with the stepping speed of the applied steps with the stepping angle of 30 degrees which is ⅙ of the pitch angle of 180 degrees because the number of pairs of the main poles is 2.

In a driving means for supplying a constant current rectangular wave as shown in FIG. 17, such a torque as shown in FIG. 18 is generated in this electric rotating machine. The torque is expressed by the following expression (3) is established and the input power can be expressed by the expression (4).

In FIG. 18 and the expressions (3) and (4), $T_1$ represents one phase of torque generated in a main pole where a total current flows; $T_2$, a total torque in the case of two-phase excitation; $P_{12}$, input power; R, a resistance component of a coil; and I, the value of the exciting current.

$$T_2 = 2T_1\cos30° = \sqrt{3}\ T_1 \qquad (3)$$

$$P_{12} = 2I^2R \qquad (4)$$

Therefore, when efficiency $T_2/P_{12}$ is represented by $K_2$, the following expression (5) is established.

$$K_2 = (\sqrt{3}/2) \cdot (T_1/I^2R) \qquad (5)$$

$K_2$ shows the efficiency in the case of the two-phase excitation.

It has been inevitable that the above-mentioned electric rotating machine is disadvantageous in the economical viewpoint in that the coils should be wound on all the main poles though there is generated no unbalanced electromagnetic force, because the number of coils is six while the number of input terminals is three, as shown in FIGS. 15 and 16.

Further, FIG. 19A shows another example of connection in which the number of coils is three. In this case, the three coils are wound on three main poles respectively, and there arises such a problem that an unbalanced electromagnetic force is generated to cause vibrations, as will be described later with reference to FIG. 19B.

Specifically, three coils 100b1, 100b2 and 100b3 are wound on main poles 100a1, 100a3 and 100a5 respectively, with their respective terminals U, V and W as shown in FIG. 19A. Then, when a current is supplied from the terminal U to the terminals V and W, the current flows in the coils 100b1, 100b2 and 100b3 in the directions as shown by arrows, and the main pole 100a1 becomes an N-pole while the main poles 100a3 and 100a5 become S-poles.

In FIG. 19B, therefore, if the radial force acting on a rotor by the main pole 100a1 is represented by $F_{a1}$, the radial force acting on the rotor by the main pole 100$a$3 is represented by $F_{a3}$, and the radial force acting on the rotor by the main pole 100$a$5 is represented by $F_{a5}$, the resultant force $F_T$ is generated by the radial force $F_{a3}$ acting on the rotor by the main pole 100$a$3 and the radial force $F_{a5}$ acting on the rotor by the main pole 100$a$5. It is apparent that the resultant force $F_T$ is smaller than the radial force $F_{a1}$. Therefore, the rotor receives a radial force in the direction of the main pole 100$a$1 by the force which is a difference between $F_{a1}$ and $F_T$. This radial force rotates in accordance with the exciting steps to make the rotor vibrates.

In addition, an exciting means which is superior in efficiency to that shown in the expression (5) has been required.

It is therefore an object of the present invention to solve the foregoing problems so as to provide a multi-phase permanent-magnet type electric rotating machine in which the number of coils is reduced by half without generating any vibrations while the machine has necessary characteristics corresponding to those of conventional machine, and to provide an exciting means superior in efficiency.

SUMMARY OF THE INVENTION

In order to solve the foregoing problems, according to the first aspect of the present invention, provided is a multi-phase permanent-magnet type electric rotating machine comprising: a hybrid rotor including an axially magnetized annular permanent magnet, and a pair of magnetic bodies each of which has a predetermined number of pole teeth formed at equal pitches on its outer circumferential edge, the pair of magnetic bodies being fixedly disposed in a manner so that the pole teeth of one of the magnetic bodies and the pole teeth of the other of the magnetic bodies are made opposite to each other while the former and the latter are circumferentially biased by ½ pitch relative to each other with the annular magnet put between the pair of magnetic bodies; and a stator disposed so as to face the rotor through an air gap therebetween, the stator having 6N (N being an integer not smaller than 1) main poles formed in a distributed fashion; wherein a three-phase permanent-magnet type electric rotating machine is arranged so that the stator has coils wound on 3N in total of the 6N main poles selected every other one.

According to the second aspect of the present invention, provided is a multi-phase permanent-magnet type electric rotating machine comprising: a permanent-magnet type rotor including a pair of comb-teeth-like magnetic bodies magnetized by an axially magnetized cylindrical permanent magnet and disposed so as to face each other in a manner so that different poles of the magnetic bodies are disposed alternately, or including a cylindrical permanent magnet having a multi-polar-magnetized outer circumferential surface; and a stator disposed so as to face the rotor through an air gap therebetween, the stator having 6N (N being an integer not smaller than 1) main poles formed in a distributed fashion; wherein a three-phase permanent-magnet type electric rotating machine is arranged so that the stator has coils wound on 3N in total of the 6N main poles selected every other one.

According to the third aspect of the present invention, in a multi-phase permanent-magnet type electric rotating machine according to the above-mentioned first or second aspect of the present invention, a five-phase permanent-magnet type electric rotating machine is arranged so that the number of the main poles of the stator is 10N and the stator has coils wound on 5N in total of the 10N main poles selected every other one.

According to the fourth aspect of the present invention, in a multi-phase permanent-magnet type electric rotating machine according to the above-mentioned first, second or third aspect of the present invention, a three- or five-phase permanent-magnet type electric rotating machine in which a predetermined number of pole teeth are formed on a top end circumferential surface of each of the main poles of the stator facing the rotor.

According to the fifth aspect of the present invention, in a multi-phase permanent-magnet type electric rotating machine according to the above-mentioned first, second, third or fourth aspect of the present invention, a three- or five-phase permanent-magnet type electric rotating machine is arranged so that the coils wound on the 3N or 5N main poles are connected into a star connection, and at least one of three or five terminals of the star connection of the coils is connected to a predetermined polarity of a power supply while all or part of the other terminals of the star connection are connected to the same opposite polarity of the power supply, whereby the polarity of one of the three or five terminals of the star connection is reversed sequentially by driving so that the rotor is made to rotate step by step.

BRIEF DESCRIPTION OF THE DRAWINGS

FIG. 2A is a sectional view taken on line IIA—IIA in FIG. 1, and FIG. 2B is a sectional view taken on line IIB—IIB in FIG. 1.

FIG. 3 is a development of the stator main poles, showing an example of connection of the coils in the three-phase electric rotating machine shown in FIG. 1;

PREFERRED EMBODIMENTS OF THE INVENTION

First Embodiment

An inner-rotor three-phase permanent-magnet type stepping motor (hereinafter simply referred to as "three-phase electric rotating machine") as a kind of multi-phase permanent-magnet type electric rotating machine to which the present invention is applied will be described in detail.

Figure 1:
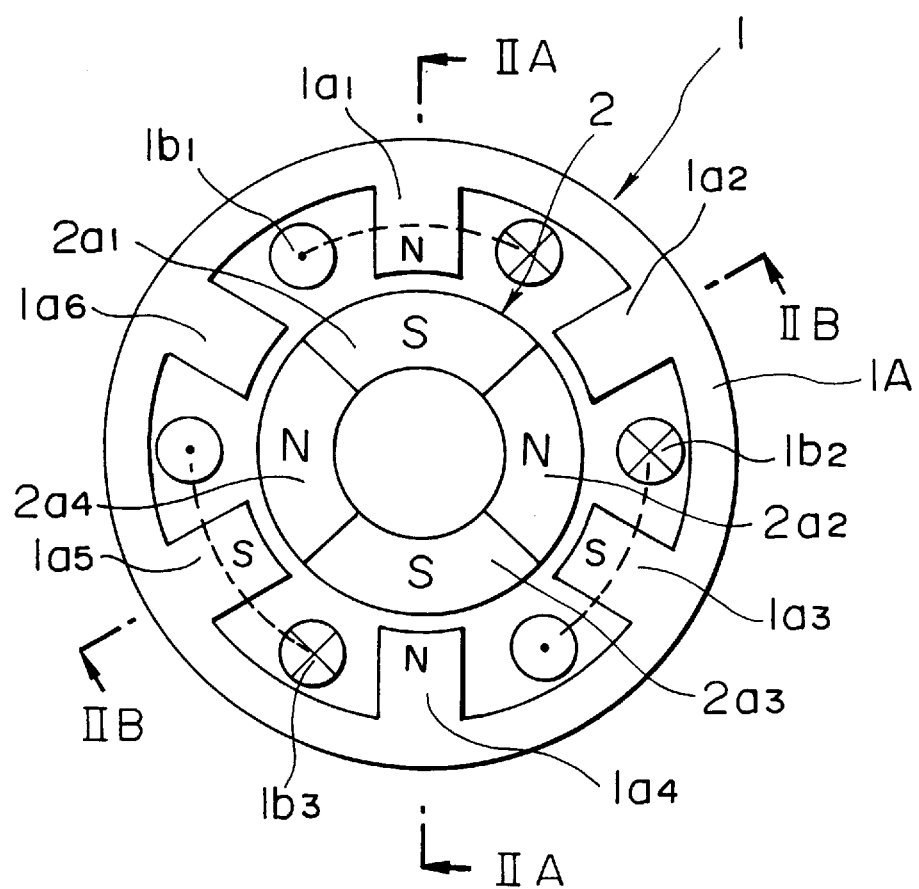
FIG. 1 is a vertically sectional front view illustrating a schematic configuration of a three-phase electric rotating machine (inner-rotor three-phase permanent-magnet type electric rotating machine) for explaining a first embodiment formed on the basis of the technical thought of the present invention.

FIG. 1 is a vertically sectional front view illustrating a schematic configuration of a three-phase electric rotating machine to which the present invention is applied. In FIG. 1, the reference numerals 1 and 2 represent a stator and a rotor, respectively. A rotation shaft and a housing and so on are not illustrated in the drawing.

The stator 1 has a yoke 1A formed of a magnetic substance, and six stator main poles (hereinafter simply referred to as "main poles") 1a1, 1a2, 1a3, 1a4, 1a5 and 1a6 formed with equal circumferential pitches and at a predetermined radial distance from the surface of the rotor 2 supported rotatably by a not-shown rotation shaft and bearings.

The rotor 2 has two pairs of magnetic poles 2a1, 2a2, 2a3 and 2a4 formed by permanent magnets. For example, the magnet poles 2a1 and 2a3 are magnetized into S-poles facing the magnetic poles of the stator, while the other magnetic poles 2a2 and 2a4 are magnetized into N-poles so that the N- and S-poles are arranged alternately.

Coils are wound on the three ones of the six main poles 1a1, 1a2, 1a3, 1a4, 1a5 and 1a6 every other one, for example, on the main poles 1a1, 1a3 and 1a5. The respective coils are illustrated symbolically by the circles. The structural size of the stator and the structural size of the coils are designed so that a magnetic field is formed efficiently also in the three main poles 1a2, 1a4 and 1a6 by supplying an exciting current to the coils wound on their adjacent main poles 1a1, 1a3 and 1a5 while no coils are wound on the main poles 1a2, 1a4 and 1a6.

FIGS. 2A and 2B show sections of FIG. 1. That is, FIG. 2A is a sectional view taken on line IIA—IIA in FIG. 1, and FIG. 2B is a sectional view taken on line IIB—IIB in FIG. 1.

Specifically, in FIG. 2A, a coil 1b1 is shown in section on a portion of the main pole 1a1 while no section of coil is shown in the sectional portion of the main pole 1a4. On the other hand, in FIG. 2B, a coil 1b2 is shown in section on a sectional portion of the main pole 1a3, while no section of coil is shown on the main pole 1a6.

FIG. 3 shows an example of connection of the respective coils in the above-mentioned configuration.

FIG. 3 shows a development of the stator, illustrating an example of coil connection in which the coils are connected in star connection.

In FIG. 3, the reference numerals 1b1, 1b2 and 1b3 are corresponding to the reference numerals of the coils shown in FIG. 1.

Specifically, in this electric rotating machine, for example, the winding start of the lead wire of the first coil 1b1 is made to be a U-terminal of this electric rotating machine, the winding start of the lead wire of the second coil 1b2 is made to be a V-terminal, the winding start of the lead wire of the third coil 1b3 is made to be a W-terminal, and the winding ends of the respective coils are connected to each other at one point.

The operation of the above-mentioned magnetic poles and coils will be described with reference to FIGS. 4 and 5 which correspond to the above-mentioned FIGS. 3 and 1, respectively.

Figure 4:
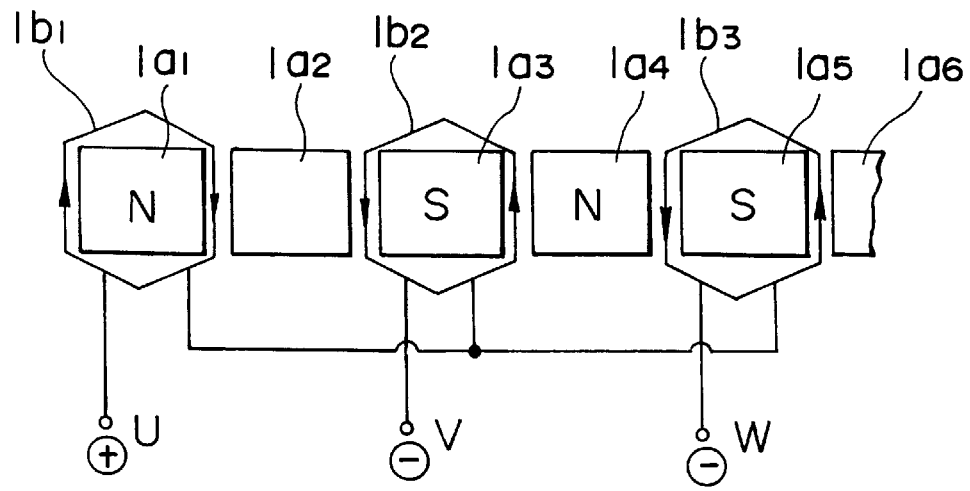
FIG. 4 is a development of the stator main poles, showing the state of magnetization in an example where a predetermined exciting current is made to flow in the coils arranged in such a manner as shown in FIG. 3.
Figure 5:
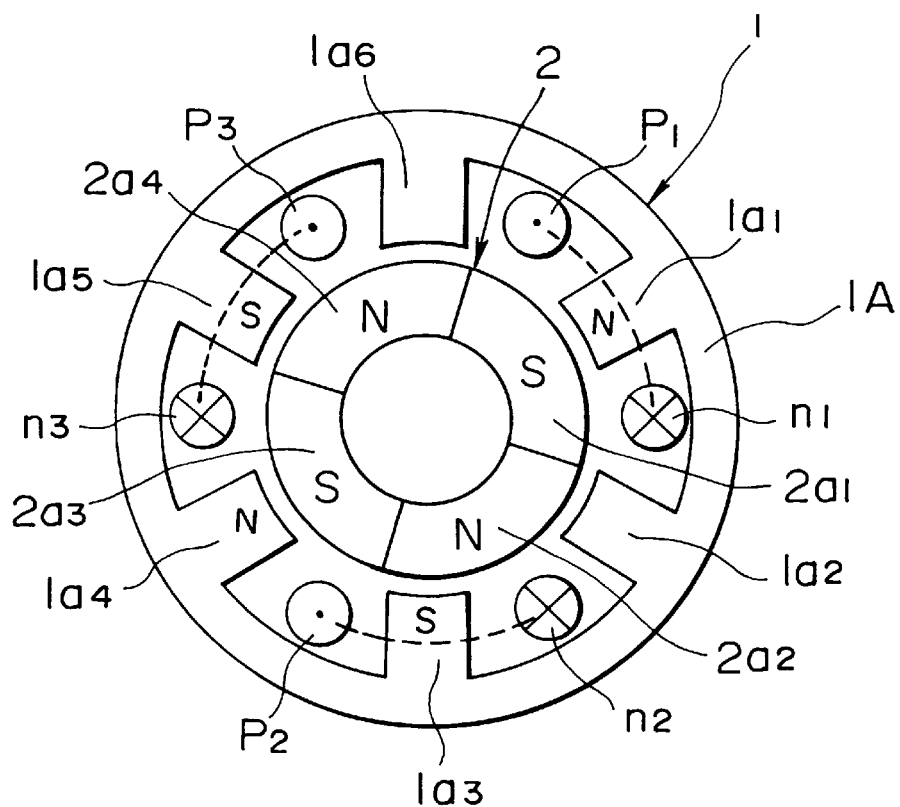
FIG. 5 is a vertically sectional front view illustrating the schematic configuration of the three-phase electric rotating machine shown in FIG. 1, showing the state of magnetization in the excitation conditions shown in FIG. 4.

Now, if an electric current is supplied to the coils as shown in FIGS. 4 and 5, magnetic poles N and S are formed in the respective main poles as illustrated also in FIGS. 4 and 5.

That is, when an electric current is supplied from the terminal U to the terminals V and W, the current flows in the respective coils in the directions indicated by arrows.

In FIG. 5, $p_1$ and $n_1$ expressed by the circles represent a portion of the coil 1b1 wound on the first main pole 1a1; $p_2$ and $n_2$, a portion of the coil 1b2 wound on the third main pole 1a3; and $p_3$ and $n_3$, a portion of the coil 1b3 wound on the fifth main pole 1a5. The symbols $p_1$, $p_2$ and $p_3$ in each of which a dot is put in the center of a circle representing a coil show that a current is supplied in the direction from the surface to the back of the paper of drawing, while the symbols $n_1$, $n_2$ and $n_3$ in each of which a cross is put a circle representing a coil show that a current is supplied from the back to the surface of the paper of drawing.

Therefore, an N-pole appears in the first main pole 1a1, an S-pole appears in the main pole 1a3, and an S-pole appears in the main pole 1a5.

In the second main pole 1a2 having no coil wound thereon, no magnetic pole is generated because currents flow in the coils provided on the adjacent main poles in the same direction as shown by $n_1$ and $n_2$. In the fourth main pole 1a4 having no coil wound thereon, however, an N-pole appears though it is weaker than that in the first main pole 1a1, because currents flow in the coils provided on the adjacent main poles flow in directions opposite to each other as shown by $p_2$ and $n_3$.

In the sixth main pole 1a6 having no coil wound thereon, no magnetic pole is generated because currents flow in the coils provided on the adjacent main poles in the same direction as shown by $p_3$ and $p_1$.

Figures 6, 7:
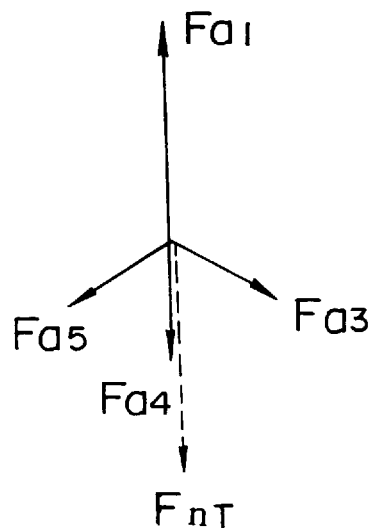
FIG. 6 is a vector diagram for explaining the radial forces generated between the stator main poles and the rotor by the excitation shown in FIG. 4.
FIG. 7 is a chart showing the driving steps in a three-phase exciting method for the three-phase electric rotating machine according to the present invention.

When a current is made to flow as mentioned above, radial forces which give influence to the rotor are generated as shown in FIG. 6 by the magnetism generated in the respective main poles.

As for the reference numerals shown in FIG. 6, $F_{a1}$ represents a radial force appearing in the first main pole 1a1; $F_{a3}$, a radial force appearing in the third main pole 1a3; $F_{a4}$, a radial force appearing in the fourth main pole 1a4; and $F_{a5}$, a radial force appearing in the fifth main pole 1a5.

That is, each of the currents flowing in the second coil 1b2 and the third coil 1b3 is half as large as the current flowing in the first coil 1b1. Therefore, when a magnetic force of the permanent magnet of the rotor is uniform in the rotor magnetic poles, the size and direction of the magnetic forces (radial forces) $F_{a3}$ and $F_{a5}$ generated in the third main pole 1a3 and the fifth main pole 1a5 relative to the magnetic force due to the magnetism generated in the first main pole 1a1 are as shown in FIG. 6 in accordance with the positional conditions of the main poles.

In addition, as mentioned above, the magnetic force (radial force) $F_{a4}$ having the size and direction shown in FIG. 6 is generated also in the fourth main pole 1a4.

Therefore, as shown in FIG. 6, if a resultant force $F_{nT}$ of the magnetic forces generated in the three main poles 1a3, 1a5 and 1a4 is formed so as to be equal in size to the radial force $F_{a1}$ appearing in the first main pole 1a1 and so as to be in the direction opposite to the direction of $F_{a1}$, the resultant force $F_{nT}$ and the radial force $F_{a1}$ appearing in the main pole 1a1 cancel each other so that no radial force is generated between the stator and the rotor, and the rotor does not vibrate even if a magnetic field rotates on the stator.

This state can be obtained by properly designing the shapes of the respective coils and the structural size of main poles where coils are not provided.

FIG. 7 shows an example of excitation in the above-mentioned connection of the coils.

In FIG. 7, the numerical values 1 to 6 in the leftmost column shows the order of exciting steps from top to bottom, returning to the step 1 after reaching the step 6.

The characters U, V and W in the uppermost row shows the terminals shown in FIGS. 3 and 4.

Specifically, the step 1 shows that a current is made to flow from the terminal U to the terminals V and W. Therefore, in the step 1, the first main pole 1a1 and the fourth main pole 1a4 become N-poles, and the third main pole 1a3 and the fifth main pole 1a5 become S-poles, as shown in FIG. 5.

Therefore, for example, when magnetic poles 2a1 and 2a3, arranged on every other one, of the rotor are S-poles while the other magnetic poles 2a2 and 2a4 are N-poles, the positional relationship between the stator 1 and the rotor 2 is as shown in FIG. 4.

The step 2 shows that a current is made to flow from the terminals U and V to the terminal W by fixing the power supply connection of the two terminals U and W while changing the power supply connection of the other terminal V. Therefore, the first main pole 1a1 and the third main pole 1a3 become N-poles, and the second main pole 1a2 and the fifth main pole 1a5 become S-poles. Therefore, the rotor 2 rotates counterclockwise in FIG. 5.

By the change of the terminals to which an exciting current is supplied and the current flowing direction as shown in FIG. 7, the electric rotating machine rotates at a rotational speed in accordance with the stepping speed of the applied steps as a three-phase three-coil type stepping motor.

The above-mentioned function will be described in detail with reference to FIG. 8.

Figure 8:
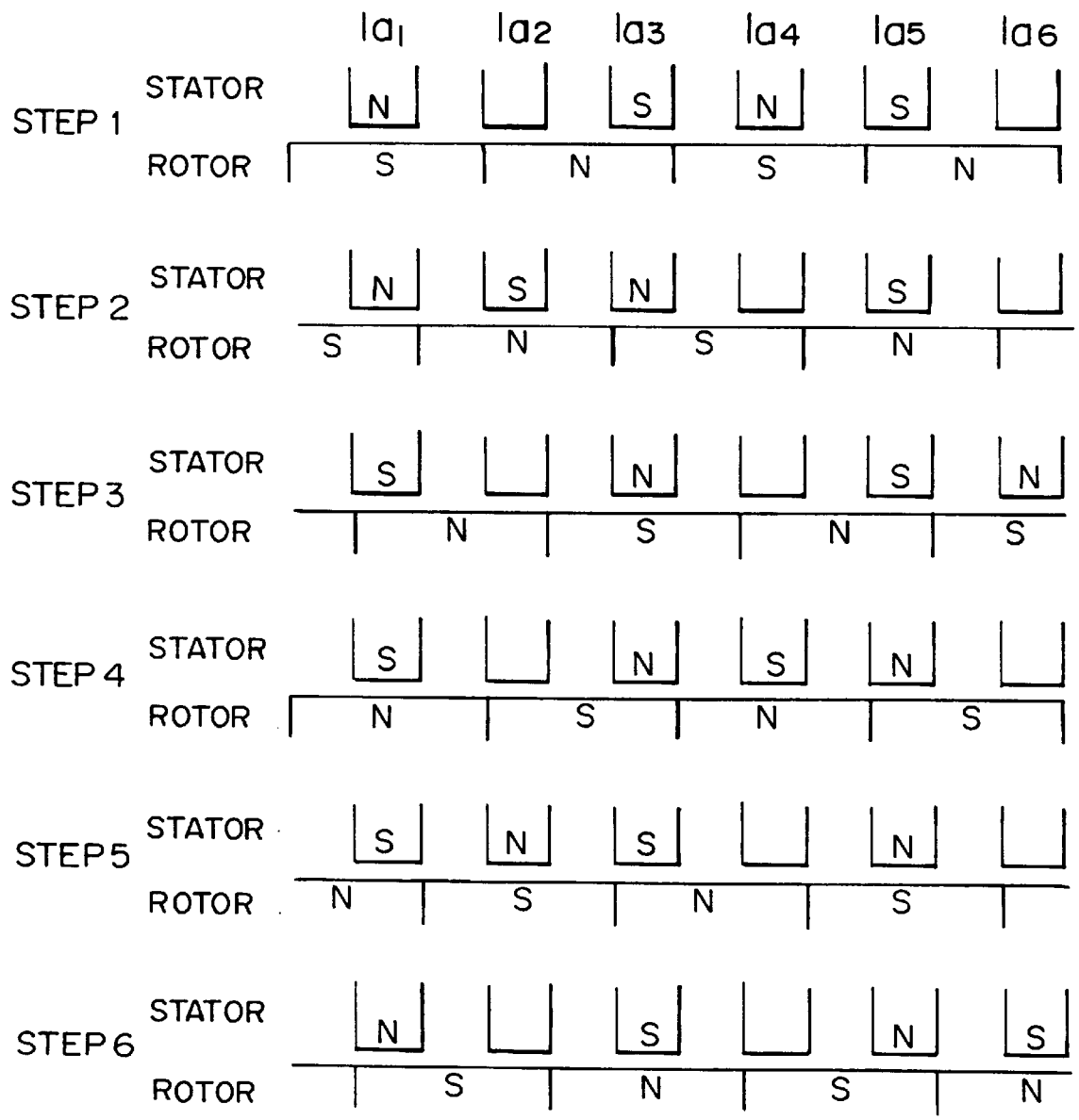
FIG. 8 is a development of the stator main poles and the rotor magnetic poles in accordance with respective exciting steps, showing the relationship between the magnetism generated in the stator main poles and the rotor magnetic poles when excitation is carried out by the exciting method shown in FIG. 7.

The steps 1 to 6 shown in the leftmost in FIG. 8 correspond to the respective steps 1 to 6 shown in FIG. 7. In addition, the position relationship between the stator and the rotor is shown in development horizontally in the respective steps. That is, in each step, the magnetism of magnetic poles appearing in the respective main poles 1a1, 1a2, 1a3, 1a4, 1a5 and 1a6 of the stator on the basis of the exciting current shown in FIG. 7 is shown in the upper row, and the positions of the magnetic poles of the rotor rotated due to the magnetic poles operating on the basis of the magnetism of these main poles and the magnetism of the respective magnetic poles of the rotor are shown in the lower row.

Therefore, the step 1 shows in development the positional relationship between the main poles of the stator and the magnetic poles of the rotor in the above-mentioned state.

The step 2 shows that an electric current is made to flow from the terminals U and V to the terminal W in FIG. 7. Therefore, as mentioned above, the first main pole 1a1 and the third main pole 1a3 become N-poles, and the second main pole 1a2 and the fifth main pole 1a5 become S-poles, as shown in FIG. 8. Therefore, the rotor 2 rotates counterclockwise, and takes a position shown in the step 2 of FIG. 8.

The position relationship between the main poles of the stator and the magnetic poles of the rotor changes successively step by step as shown in FIG. 8 by the change of the terminals to which an exciting current is supplied and the current flowing direction as shown in FIG. 7. The step returns to the step 1 upon reaching the step 6 and the rotor completes its one revolution.

By repeating the excitation from the step 1 thereafter, this three-phase electric rotating machine rotates at a rotational speed in accordance with the stepping speed of the applied steps with the stepping angle of 30 degrees which is ⅙ as large as the pitch angle of 180 degrees which is pitch angle of the pole pairs.

Second Embodiment

Figure 16:
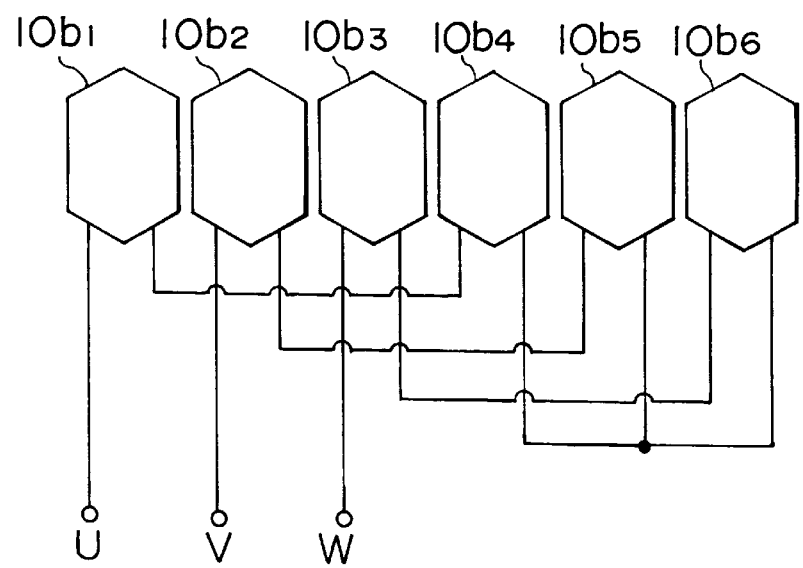
FIG. 16 is a development of the stator main poles, showing the state of connection of the coils of the three-phase electric rotating machine shown in FIG. 15.
Figures 17, 18:
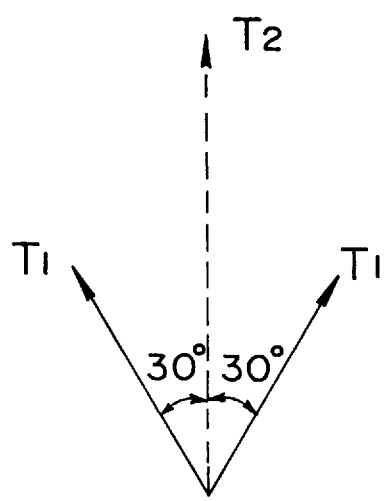
FIG. 17 is a chart showing the driving steps in an exciting method by means of the connection shown in FIG. 16.
FIG. 18 is a vector diagram for explaining the torque generated when excitation is carried out in the conventional three-phase electric rotating machine by the exciting method shown in FIG. 17.
Figure 19A:
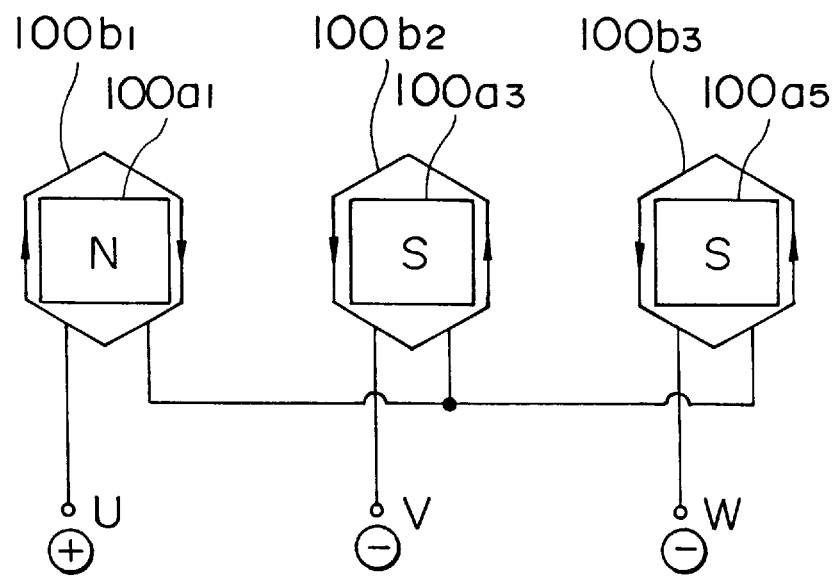
FIG. 19A is a development of the stator main poles when three-winding excitation is carried out in the conventional three-phase electric rotating machine.
Figure 19B:
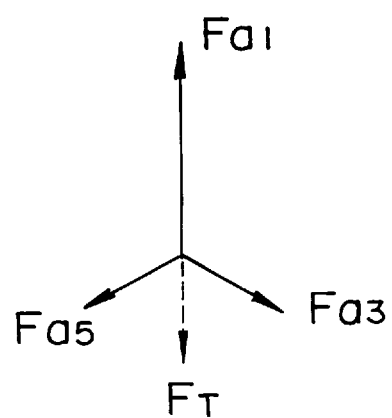
FIG. 19B is a vector diagram of radial forces generated between the main poles and the rotor, for explaining problems when three-winding excitation is carried out in the conventional three-phase electric rotating machine.

Description will be made about a second embodiment where the excitation steps shown in FIGS. 7 and 8 are applied to a three-phase stepping motor excited and driven by coils the number of which is 6N and which are wound on respective main poles the number of which is also 6N, as shown in FIG. 16.

Figure 9:
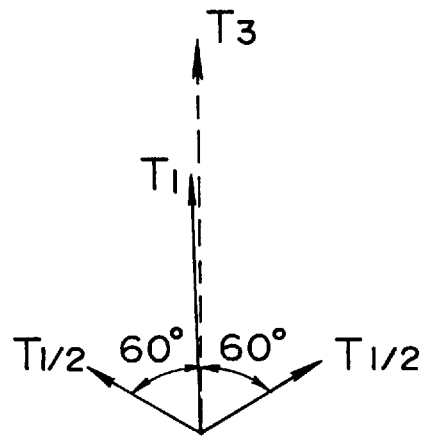
FIG. 9 is a vector diagram for explaining the torque generated between the stator main poles with coils wound thereon, and the rotor magnetic poles by the excitation in the three-phase electric rotating machine according to the present invention.

That is, when the electric rotating machine with the structure and coil connection shown in FIG. 16 is driven with a three-phase constant-current rectangular wave in the driving steps shown in FIG. 7, the total torque generated between the main poles of the stator and the magnetic poles of the rotor is as shown in FIG. 9. Accordingly, the following expression (6) is established, and the input can be expressed by the expression (7).

In FIG. 9 and the expression (6), $T_1$ represents the torque of one phase generated in a main pole where a total current flows, and $T_1/2$ represents the torque of one phase generated in a main pole where half of the current flows.

In addition, $T_3$ in the following expressions represents the total torque in the case of this three-phase excitation; $P_1$, input power; R, a resistance component of a coil; I, an exciting current value; and $K_3$, the efficiency in the case of this three-phase excitation.

$$T_3 = 2T_1 \cos 60° + T_1 = 1.5T_1 \qquad (6)$$

$$P_1 = 2(I/2)^2 R + I^2 R = 1.5 I^2 R \qquad (7)$$

Therefore, the efficiency $T_3/P_1$ can be expressed by the following expression (8).

$$K_3 = T_3/P_1 = 1.5T_1/1.5I^2R \qquad (8)$$
$$= T_1/I^2R$$

In the case of two-phase excitation described above with respect to the prior art, $K_2=(\sqrt{3}/2)\cdot(T_{1/I}{}^2R)$ is established by the expression (5), so that the efficiency of the conventional two-phase excitation is 86.6% of that of the three-phase excitation according to this second embodiment.

Third Embodiment

Although an inner-rotor type rotating machine where a stator is disposed outside and a rotor is disposed inside was described in the first embodiment, even an outer-rotor type rotating machine where a stator having main poles disposed in its outer side is fixed inside and a rotor is provided to rotate in the outside of the stator may operate in the same manner as the inner-rotor type rotating machine, if the outer-rotor type rotating machine is configured by referring to the function and configuration of the inner-rotor type stepping motor described in the first embodiment.

Fourth Embodiment

Figure 10:
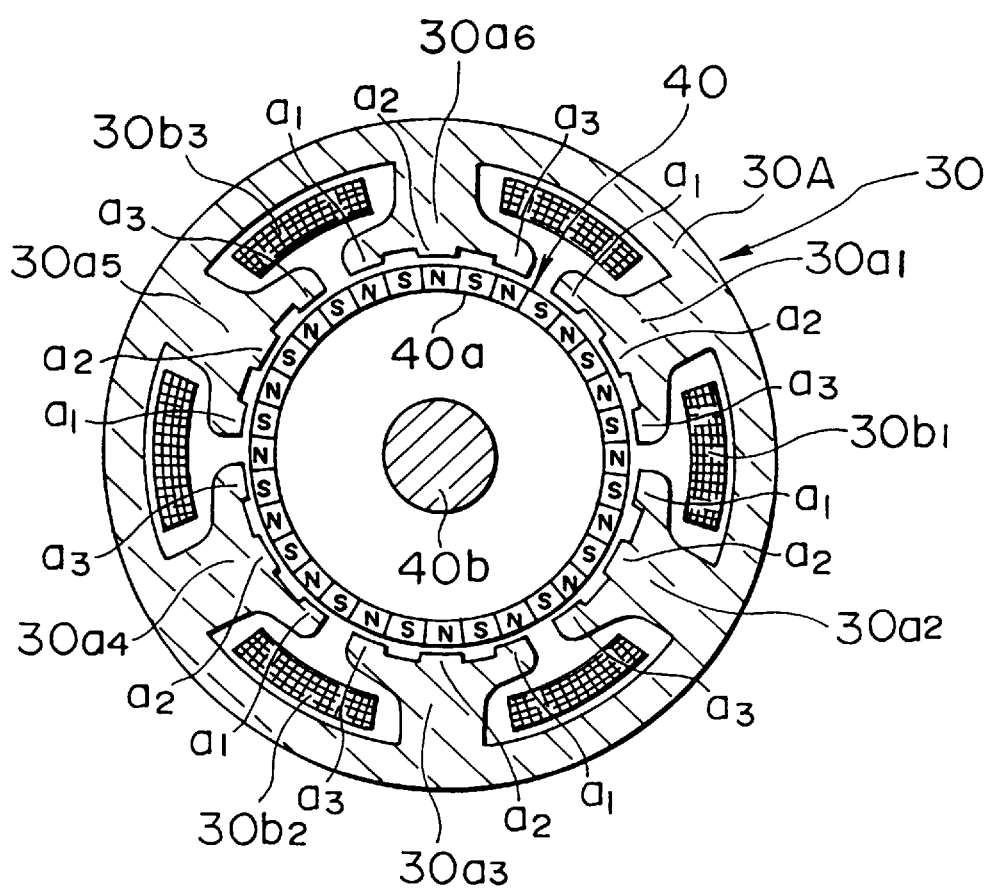
FIG. 10 is a vertically sectional front view illustrating a schematic configuration of a three-phase electric rotating machine as a fourth embodiment.

A fourth embodiment where three pole teeth are formed at equal pitches in each of the main poles of the three-phase electric rotating machine described in the first embodiment will be described with reference to FIG. 10. FIG. 10 is a sectional view of a three-phase electric rotating machine corresponding to FIG. 1, and detailed illustration of members such as a housing and so on is omitted.

In FIG. 10, the reference numerals 30 and 40 represent a stator and a rotor, respectively.

The stator 30 has a yoke 30A formed of a magnetic substance, and six stator main poles (hereinafter simply referred to as "main poles") 30a1, 30a2, 30a3, 30a4, 30a5 and 30a6 are formed on the yoke at equal pitches so as to face the rotor 40 at a predetermined distance therebetween.

Three pole teeth $a_1$, $a_2$ and $a_3$ are formed, at equal pitches, on each of the main poles 30a1, 30a2, 30a3, 30a4, 30a5 and 30a6 so as to face the rotor 40.

The rotor 40 is formed so as to be rotatable by means of a rotation shaft 40b supported by not-shown bearings. S- and N-poles are formed, by permanent magnets, alternately at equal pitches on an outer circumferential portion 40a of the rotor 40 so as to face the main pole surfaces of the stator. The character S in the outer circumferential portion 40a represents an S-pole of a permanent magnet magnetized so as to face the main pole of the stator 30 while N represents an N-pole of a permanent magnet magnetized so as to face the main pole of the stator 30. The pitch of the poles of the permanent magnets is set so as to correspond to the pitch of the pole teeth formed on the respective main poles of the stator.

In addition, in the same manner as in the first embodiment, coils are wound on the three main poles which are selected from the six main poles 30a1, 30a2, 30a3, 30a4, 30a5 and 30a6 every other one.

That is, a first coil 30b1 is wound on the first main pole 30a1, a second coil 30b2 on the third main pole 30a3, and a third coil 30b3 on the fifth main pole 30a5, respectively. The three main poles 30a2, 30a4 and 30a6 adjacent to the main poles 30a1, 30a3 and 30a5 on which the coils are wound are designed so as to generate proper magnetic forces in accordance with the conditions of exciting currents when the exciting currents are supplied to the respective coils 30b1, 30b2 and 30b3, in the same manner as in the electric rotating machine described in the first embodiment.

Therefore, this embodiment functions in the same manner as the first embodiment.

Fifth Embodiment

Although the main poles of the stator and the magnetic poles of the rotor are arranged in parallel with the rotation shaft in the above-mentioned inner-rotor type electric rotating machine, the same function as in the first embodiment can be obtained if the main poles of the stator and the magnetic poles of the rotor are arranged perpendicularly to the rotation shaft.

Figure 11A:
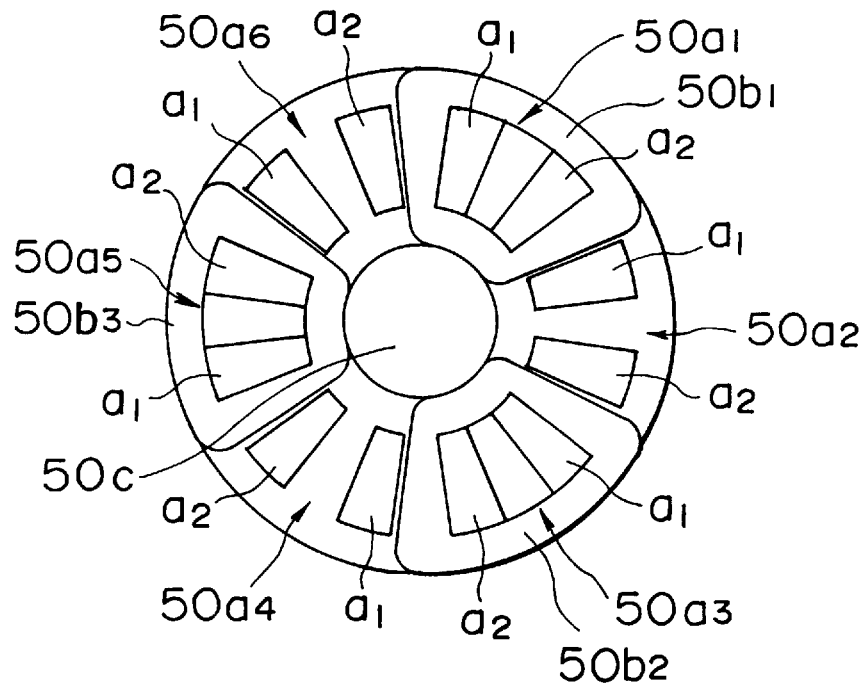
FIGS. 11A and 11B show a configuration of the three-phase electric rotating machine according to a fifth embodiment respectively, FIG. 11A being front view of the stator main poles, FIG. 11B being a front view of the rotor magnetic poles.
Figure 11B:
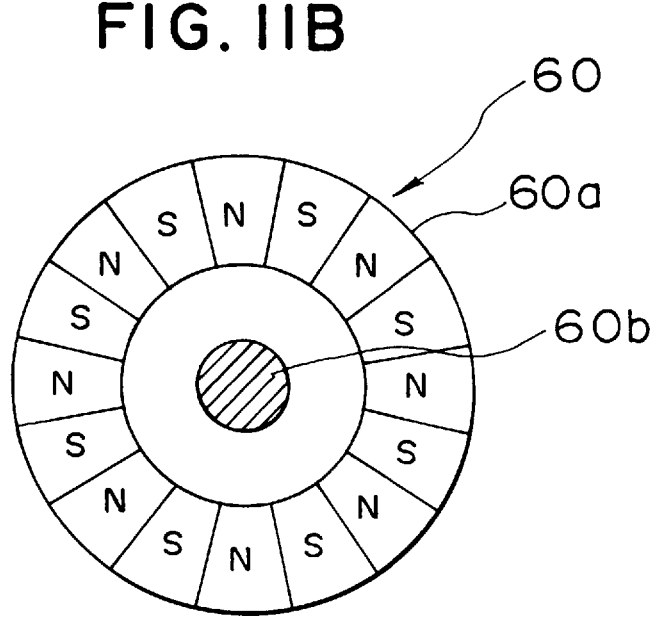

FIGS. 11A and 11B show an axial-gap type electric rotating machine according to a fifth embodiment, where main poles of a stator and magnetic poles of a rotor are arranged perpendicularly to the rotation shaft, that is, a gap between the stator and the rotor is formed perpendicularly to the rotation shaft.

FIG. 11A shows symbolically the structure of the stator viewed from the direction of the rotation shaft, that is, viewed from the plane of the main poles, and FIG. 11B shows symbolically the structure of the rotor viewed from the direction of the rotation shaft, that is, viewed from the plane of the magnetic poles.

That is, the axial-gap type electric rotating machine is formed so that the surface of the stator shown in FIG. 11A and the surface of the rotor shown in FIG. 11B face each other with a predetermined distance therebetween.

FIGS. 11A and 11B show the configuration according to the present invention, and detailed illustration of members such as a housing, etc., is omitted in the drawing.

In FIG. 11A showing the stator, each of the main poles 50a1, 50a2, 50a3, 50a4, 50a5 and 50a6 has pole teeth $a_1$ and $a_2$ formed on its top end at equal intervals.

The main pole portion of the stator is formed from one sheet of magnetic steel by pressing the sheet so that the sheet projects to this side of the paper of the drawing. Coils 50b1, 50b2 and 50b3 are wound on the projected lower portions of three main poles 50a1, 50a3 and 50a5 which are selected every other one of the six main poles.

Also the three main poles 50a2, 50a4 and 50a6 adjacent to the main poles 50a1, 50a3 and 50a5 having the coils wound thereon generate proper magnetic forces in accordance with the conditions of exciting currents when the exciting currents are supplied to the respective coils 50b1, 50b2 and 50b3, in the same manner as in the electric rotating machine described in the first embodiment.

In FIG. 11B, the reference numeral 60 represents the surface of the rotor, and 60a represents a disc-like magnetic pole portion. In addition, N represents the N-pole magnetized in a permanent magnet, and S represents the S-pole magnetized in a permanent magnet. The N- and S- poles are established at equal pitches correspondingly to the pitches of the above-mentioned pole teeth of the stator.

The reference numeral 60b represents a section of a rotation shaft, and 50c shown in FIG. 11A represents a hole portion to be penetrated by the rotation shaft 60b.

Although the embodiment of two pole teeth provided in each main pole was described in this embodiment, the number of the pole teeth may be formed desirably, for example, such that no teeth or two or more teeth may be provided correspondingly to the pitches of magnetic poles formed in the rotor and in accordance with functional characteristics required for the electric rotating machine.

It is a matter of course that pole teeth may be provided also in the case of the outer-rotor type shown electric rotating machine in the second embodiment.

Sixth Embodiment

A sixth embodiment in which the number of main poles of a stator is 6N where N is 2, that is, the number of the main poles is 12 will be described with reference to FIG. 12.

Figure 12:
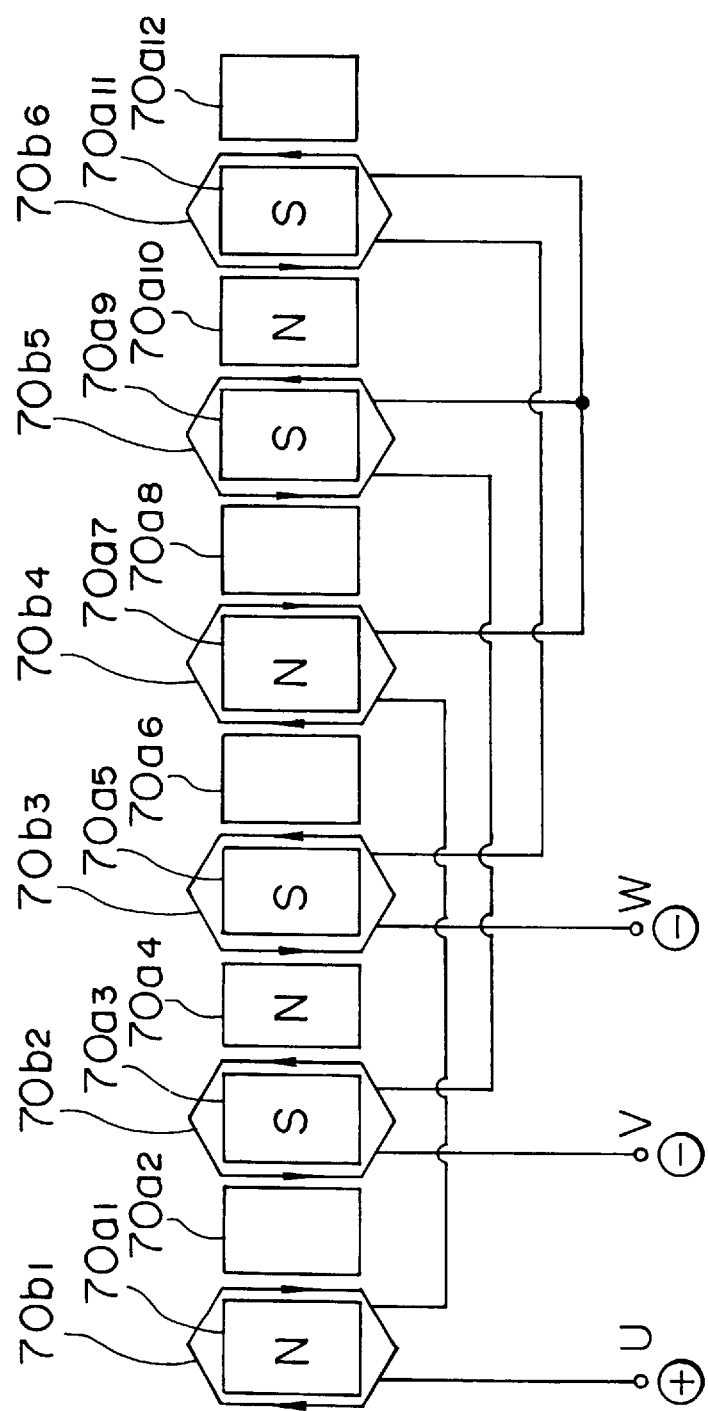
FIG. 12 is a development of the stator main poles of the three-phase electric rotating machine according to a sixth embodiment.

FIG. 12 shows the state where a main pole portion of a stator is developed, and respective coils are connected in star connection. The structure of this electric rotating machine can be understood easily if the number of main poles of a stator, that is, the arrangement structure is changed, and the number of magnetic poles of a rotor is changed correspondingly to the number of the main poles of the stator on the basis of the structure diagrams of FIGS. 1 to 10. Accordingly, the illustration of the structure of this embodiment is omitted in the drawing.

That is, in FIG. 12, the reference numerals 70a1, 70a2, 70a3, 70a4, 70a5, 70a6, 70a7, 70a8, 70a9, 70a10, 70a11 and 70a12 represent main poles. Coils are wound on the 6 main poles which are selected from the 12 main poles every other one. Specifically, a first coil 70b1 is wound on the first main pole 70a1, a second coil 70b2 is wound on the third main pole 70a3, a third coil 70b3 is wound on the fifth main pole 70a5, a fourth coil 70b4 is wound on the seventh main pole 70a7, a fifth coil 70b5 is wound on the ninth main pole 70a9, and a sixth coil 70b6 is wound on the eleventh main pole 70a11.

In addition, the first coil 70b1 and the fourth coil 70b4 are connected in series to each other in the same winding direction, the second coil 70b2 and the fifth coil 70b5 are connected in series to each other in the same winding direction, the third coil 70b3 and the sixth coil 70b6 are connected in series to each other in the same winding direction, and the terminals of the fourth coil 70b4, the fifth coil 70b5 and the sixth coil 70b6 which are not connected to any other coils are connected to each other at one and the same point.

In addition, the terminal of the first coil 70b1 which is not connected to any other coil is led out as a terminal U, the terminal of the second coil 70b2 which is not connected to any other coil is led out as a terminal V, and the terminal of the third coil 70b3 which is not connected to any other coil is led out as a terminal W.

FIG. 12 illustrates a state where an electric current is supplied from the terminal U to the terminals V and W. In FIG. 12, the symbol (+) is added to the circle in the terminal U to which a current is supplied, while the symbol (−) is added to the circle in the terminals V and W from which the current flows out. The arrows represent the direction of currents flowing in the respective coils.

Also in this embodiment, the six main poles 70a2, 70a4, 70a6, 70a8, 70a10 and 70a12 adjacent to the main poles 70a1, 70a3, 70a5, 70a7, 70a9 and 70a11 on which the coils are wound generate proper magnetic forces in accordance with the conditions of exciting currents when the exciting currents are supplied to the respective coils 70b1, 70b2, 70b3, 70b4, 70b5 and 70b6, in the same manner as in the electric rotating machine described in the first embodiment.

Therefore, as shown in FIG. 12, a magnetic force is generated not only in the main poles on which the coils are wound, but also in the main pole on opposite sides of which currents flow in the coils in the directions opposite to each other as shown by the arrows, while no magnetic force is generated in the main pole on opposite sides of which currents flow in the coils in the same direction as shown by the arrows. Therefore, in the relationship of these main poles and the winding directions of the coils, N-poles appear in the first main pole 70a1, the forth main pole 70a4, the seventh main pole 70a7, and the tenth main pole 70a10, and an S-pole appear in the third main pole 70a3, the fifth main pole 70a5, the ninth main pole 70a9, and the eleventh main pole 70a11.

As shown in the first embodiment and so on, if currents to be supplied to the respective terminals U, V and W are controlled properly, the magnetism appearing in the respective main poles rotate, and the respective radial forces acting in the directions toward the rotor cancel each other so that the rotor can rotate without vibrating.

Further, in the case of three terminal connection, even if the coils are connected in the form of a delta connection, it is a matter of course that the same effect as that in the case of a star-connection can be obtained.

Seventh Embodiment

A seventh embodiment in which the number of main poles of a stator is 5N where N is 2, that is, the number of the main poles is 10 will be described with reference to FIG. 13.

Figure 13:
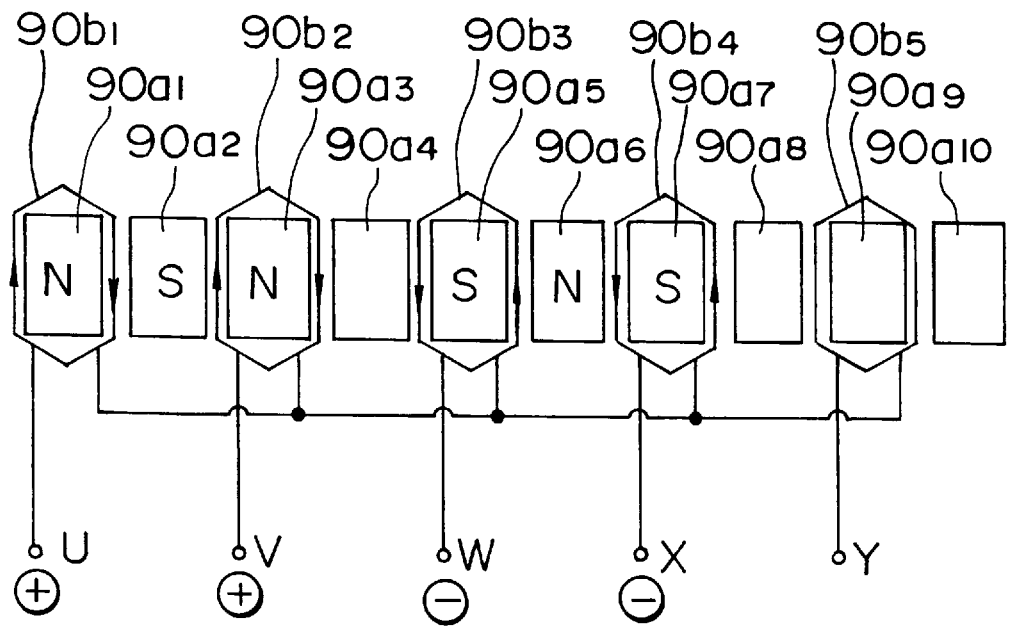
FIG. 13 is a development of the stator main poles of the five-phase electric rotating machine according to a seventh embodiment.

FIG. 13 shows the state where a main pole portion of a stator is developed and respective coils are connected in star connection. The structure of this electric rotating machine can be understood easily if the number of main poles of a stator, that is, the arrangement structure is changed, and the number of magnetic poles of a rotor is changed correspondingly to the number of the main poles of the stator on the basis of the structure diagrams of FIGS. 1 to 10, so that the illustration of the structure is omitted.

That is, in FIG. 13, the reference numerals 90a1, 90a2, 90a3, 90a4, 90a5, 90a6, 90a7, 90a8, 90a9 and 90a10 represent main poles. Coils are wound on the 5 main poles which are selected from the 10 main poles every other one. Specifically, a first coil 90b1 is wound on the first main pole 90a1, a second coil 90b2 is wound on the third main pole 90a3, a third coil 90b3 is wound on the fifth main pole 90a5, a fourth coil 90b4 is wound on the seventh main pole 90a7, and a fifth coil 90b5 is wound on the ninth main pole 90a9.

In addition, a predetermined end of the first coil 90b1 in the winding direction is made to be a terminal U, an end of the second coil 90b2 in the same winding direction as the first coil 90b1 is made to be a terminal V, an end of the third coil 90b3 in the same winding direction as the first coil 90b1 is made to be a terminal W, an end of the fourth coil 90b4 in the same winding direction as the first coil 90b1 is made to be a terminal X, an end of the fifth coil 90b5 in the same winding direction as the first coil 90b1 is made to be a terminal Y, and the other sides of the respective coils are connected to each other at one point.

FIG. 13 illustrates a state where an electric current is supplied from the terminals U and V to the terminals W and X. In FIG. 12, the symbol (+) is added to the circle in the terminals U and V to which a current is supplied, while the symbol (−) is added to the circle in the terminals W and X from which the current flows out. The arrows represent the direction of currents flowing in the respective coils.

Also in this embodiment, the five main poles 90a2, 90a4, 90a6, 90a8 and 90a10 adjacent to the main poles 90a1, 90a3, 90a5, 90a7 and 90a9 wound with coils generate proper magnetic forces in accordance with the conditions of exciting currents when the exciting currents are supplied to the respective coils 90b1, 90b2, 90b3, 90b4 and 90b5, in the same manner as in the above-mentioned embodiments.

Therefore, as shown in FIG. 13, a magnetic force is generated not only in the main poles on which the coils are wound, but also in the main poles on opposite sides of which currents flow in the coils in the directions opposite to each other as shown by the arrows, while no magnetic force is generated in the main pole on opposite sides of which currents flow in the coils in the same direction as shown by the arrows.

Therefore, in the current conditions as illustrated, N-poles appear in the first main pole 90a1, the third main pole 90a3, and the sixth main pole 90a6, and S-poles appear in the second main pole 90a2, the fifth main pole 90a5, and the seventh main pole 90a7.

As shown in the first embodiment and so on, if currents to be supplied to the respective terminals U, V, W, X and Y are switched in a predetermined order properly, magnetism appearing in the respective main poles rotate, and the respective radial forces acting in the directions toward the rotor cancel each other so that the rotor can rotate without vibrating.

Eighth Embodiment

Figure 14:
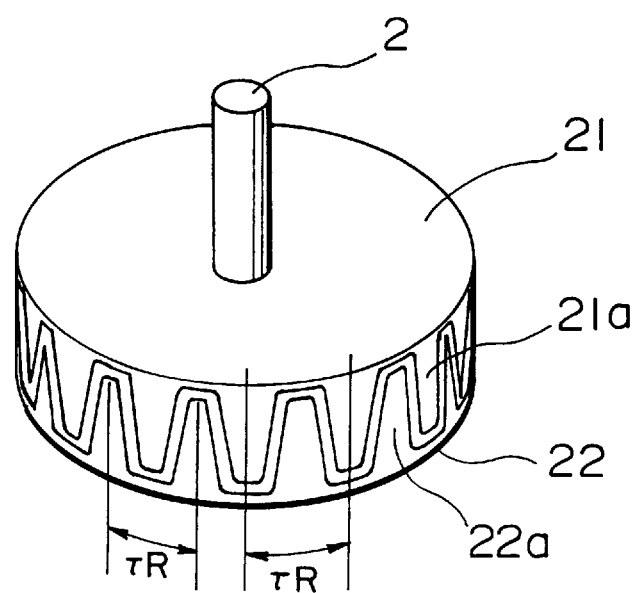
FIG. 14 is a perspective view of a hybrid rotor according to an eighth embodiment.
Figure 15:
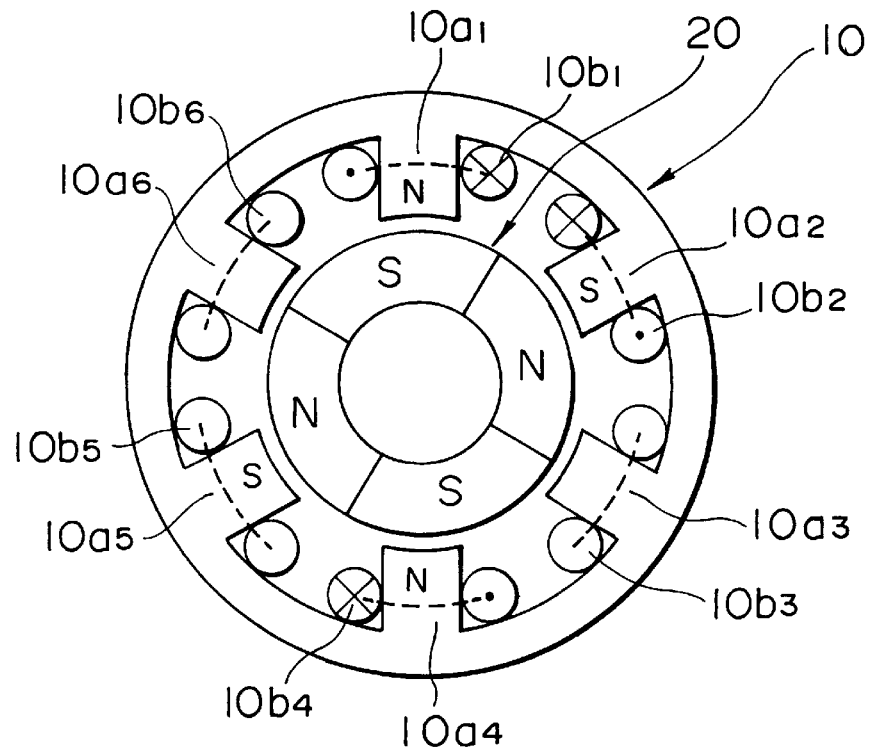
FIG. 15 is a vertically sectional front view illustrating a schematic configuration of a conventional three-phase electric rotating machine (inner-rotor three-phase permanent-magnet type electric rotating machine)

Although the rotor shown in each of the above-mentioned embodiments is a cylindrical permanent-magnet type rotor, the rotor may be of such a structure of combination of claw poles and a cylindrical permanent-magnet as shown in FIG. 14, or the rotor may be of a hybrid type rotor through the detail explanation is omitted here.

The above-mentioned embodiments describe the structure and operation of the electric rotating machine according to the present invention, by way of example. It is a matter of course that parts other than that in the above-mentioned embodiments, for example, the stator can be applied to a stepping motor having a claw pole structure, if the above-mentioned technical thought of the present invention is applied.

A multi-phase permanent-magnet type electric rotating machine according to the present invention is designed so as to be able to be excited in a manner as described above so that the multi-phase permanent-magnet type electric rotating machine has superior effects as follow even in the case where a cylindrical permanent-magnet rotor is used, a permanent-magnet rotor constituted by combination of claw poles and a cylindrical permanent-magnet is used, or a hybrid type rotor is used.

(1) In a three-phase electric rotating machine, the performance of a six-pole structure can be realized without producing any unbalanced magnetic force like in a conventional three-pole structure.

(2) The present invention can be applied to an odd-phase electric rotating machine, such as five-phase electric rotating machine as mentioned above.

(3) In the case of constant-current rectangular-wave driving in star connection, the efficiency can be improved in comparison with not only the conventional two-phase excitation in the above-mentioned three-phase structure but also the conventional four-phase excitation in the five-phase structure.

I claim:

1. A multi-phase permanent-magnet electric rotating machine, comprising:

a permanent-magnet type rotor including pairs of magnetic bodies magnetized such that the N-poles and S-poles are arranged alternately to form a circular configuration around a central axis;

a stator disposed so as to face said rotor through an air gap between said stator and said rotor wherein said stator has one of 6N and 10N (N being an integer) main poles formed in a distributed fashion;

one of 3N and 5N coils respectively wound on alternate ones of said 6N and 10N main poles of said stator; and means for supplying power to said coils whereby total combined intensity of radial magnetic force generated between said rotor and said 6N or 10N main poles, including not-wound main poles, when a current is supplied into all or a part of one of said 3N or one of said 5N coils, is substantially cancelled.

2. The multi-phase permanent-magnet electric rotating machine according to claim 1 wherein each of said main poles of said stator facing said rotor include a top end circumferential surface having a predetermined number of pole teeth.

3. The multi-phase permanent-magnet electric rotating machine according to claim 2 wherein the pitch of said rotor poles corresponds to a pitch of said pole teeth formed on the respective main poles of said stator.

4. The multi-phase permanent-magnet type electric rotating machine according to claim 1 wherein said coils wound on one of said 3N and 5N main poles are connected into a star connection and at least one of three and five terminals of said star connection of said coil is connected to a predetermined polarity of a power supply with at least one other terminal of said star connection being connected to a polarity opposite to said predetermined polarity of said power supply, whereby the polarity of one of said three and five terminals of said star connection is reversed sequentially by a driving voltage so that said rotor is made to rotate step by step.

5. A multi-phase permanent-magnet electric rotating machine, comprising:

a hybrid type rotor including axially magnetized permanent magnet interposed between two magnetic bodies each having a predetermined number of pole teeth formed at equal pitches on an outer circumference thereof;

a stator disposed so as to face said rotor through an air gap between said stator and said rotor wherein said stator has one of 6N and 10N (N being an integer) main poles formed in a distributed fashion;

one of 3N and 5N coils respectively wound on alternate ones of said 6N and 10N main poles of said stator; and means for supplying power to said coils whereby total combined intensity of radial magnetic forced generated between said rotor and said 6N or 10N main poles, including not-wound main poles, when a current is supplied into all or a part of one of said 3N and 5N coils, is substantially cancelled.

* * * * *